US009579708B2

(12) United States Patent
Baerthlein et al.

(10) Patent No.: US 9,579,708 B2
(45) Date of Patent: Feb. 28, 2017

(54) EXPANSION HEAD FOR EXPANSION TOOLS, EXPANSION TOOL COMPRISING SAID EXPANSION HEAD AND USE THEREOF

(71) Applicant: REHAU AG + Co, Rehau (DE)

(72) Inventors: Sebastian Baerthlein, Erlangen (DE); Sven Christoph, Weisendorf (DE); Richard Sapper, Schwabach (DE)

(73) Assignee: REHAU AG + CO, Rehau (DE)

(*) Notice: Subject to any disclaimer, the term of this patent is extended or adjusted under 35 U.S.C. 154(b) by 86 days.

(21) Appl. No.: 14/375,139

(22) PCT Filed: Feb. 1, 2013

(86) PCT No.: PCT/EP2013/000312
§ 371 (c)(1),
(2) Date: Jul. 29, 2014

(87) PCT Pub. No.: WO2013/113509
PCT Pub. Date: Aug. 8, 2013

(65) Prior Publication Data
US 2015/0306652 A1    Oct. 29, 2015

(30) Foreign Application Priority Data
Feb. 3, 2012   (DE) .................. 10 2012 100 894

(51) Int. Cl.
*B21D 39/20* (2006.01)
*B21D 41/02* (2006.01)
*B29C 57/04* (2006.01)

(52) U.S. Cl.
CPC ........... *B21D 39/20* (2013.01); *B21D 41/028* (2013.01); *B29C 57/04* (2013.01)

(58) Field of Classification Search
CPC ...... B21D 39/20; B21D 41/02; B21D 41/026; B21D 41/028; B21D 39/08; B21D 41/00;
(Continued)

(56) References Cited

U.S. PATENT DOCUMENTS

2013/0140739 A1*  6/2013  Lundequist ............ B21D 39/20
264/312

FOREIGN PATENT DOCUMENTS

EP    0 718 057 A2    6/1996
EP    0 878 287 A1    11/1998
(Continued)

OTHER PUBLICATIONS

International patent application No. PCT/EP2013/000312, International Search Report, Jul. 17, 2013.

*Primary Examiner* — Teresa M Ekiert
(74) *Attorney, Agent, or Firm* — Da Vinci Partners LLC; John Moetteli

(57) ABSTRACT

Expansion head for expansion tools for hollow workpieces, particularly for the ends of plastic pipes and metal-plastic composite pipes, comprising a union cap with a radially inwardly oriented guide flange, and a set of sector-shaped expandable jaws, each of which is individually received in the union cap in a radially movable manner by an inner flange sector that overlaps with the guide flange, the set of sector-shaped expandable jaws being movable between a closed state and an expansion state, and an approximately cylindrical lateral surface being embodied in the closed state by the outer wall of the expandable jaws, wherein the outer wall has at least one recess and/or raised area extending in the direction of the longitudinal axis of the expandable jaws.

18 Claims, 4 Drawing Sheets

(58) Field of Classification Search
CPC ....... B21D 41/021; B29C 57/04; B29C 51/02; B21C 3/16
See application file for complete search history.

(56) References Cited

FOREIGN PATENT DOCUMENTS

| | | |
|---|---|---|
| JP | 2003 062902 | 3/2003 |
| JP | 2010 051974 | 3/2010 |

\* cited by examiner

EXPANSION HEAD FOR EXPANSION TOOLS, EXPANSION TOOL COMPRISING SAID EXPANSION HEAD AND USE THEREOF

CROSS REFERENCE TO RELATED APPLICATIONS

This application is the National Stage of International Application No. PCT/EP2013/000312, filed Feb. 1, 2013, which claims benefit under 35 USC §119(a), to German patent application Ser. No. 10 2012 100 894.9, filed Feb. 3, 2012.

The present invention relates to an expansion head for expansion tools for hollow workpieces, particularly for the ends of plastic pipes and metal-plastic composite pipes, wherein the expansion head comprises a union cap with a guide flange oriented radially inward and a set of sector-shaped expandable jaws, each of which is received individually by an inner flange sector, overlapping with the guide flange, so as to be housed in a radially movable manner in the union cap, the set of sector-shaped expandable jaws being movable between a closed state and an expanded state and, when the jaws are in the closed state, an approximately cylindrical lateral surface is formed by the outer wall of the expandable jaws.

Such expansion heads are known from EP 0 044 795 A2 and DE 42 02 348 C1. The expansion heads consist of individual segments, the so-called expandable jaws, whose basic parts are housed in a union cap and can be moved outward in the radial direction. Such expansion heads are mounted on expansion tools and particularly connected thereto via a screw connection. The expansion devices are basically constructed of a pressing device with an arbor that is held in or on the housing of the pressing device in an axially movable manner and has on its one axial end area a tapered surface, and an expansion head that can preferably be fixed to the pressing device via a holding device for the expansion head. Through a drive device, which can be driven manually or mechanically, the arbor is moved in the axial direction in the direction of the expansion head. On the interior, the expandable jaws define a central tapered receptacle into which the tapered surface of the arbor that can be moved by the pressing device in the axial direction engages. Upon actuation of the pressing device, the arbor is pressed into the expansion head, resulting in contact between the tapered surface of the arbor and the receptacle formed by the expandable jaws. Upon further axial movement of the arbor in the direction of the expansion head, the expandable jaws are pressed radially outward, and the expandable jaws are lifted radially, so that the expandable jaws the ends of a hollow workpiece, particularly of a plastic pipe or of a metal-plastic composite pipe, into which the expansion head is guided. The expandable jaws transition from the closed state into the expansion state or open state. When the arbor moves radially backward from the expansion head, the segments are moved back by return means (an annular pull-spring or an elastic O-ring, for example) into their starting position. With the expansion heads described in EP 0 044 795 A2 or DE 42 02 348 C1, the intention is to achieve an expansion of the hollow workpiece during the expansion process that is as uniform as possible. In this context, it can be necessary to rotate, by a predetermined angle, the position of the expansion head in the end of the pipe after releasing of the expandable jaws (for expansion heads with six expandable jaws, the rotation should occur by an angle of preferably about 30°) and perform a second expansion procedure.

It is necessary to regularly expand the end of a pipe in order to achieve a tight connection after insertion of a connecting piece through pressing with a sliding or crimp sleeve guided over the end of the pipe. However, these expansion heads have the drawback that a tight connection already occurs before pressing (the axial pushing on of a sliding sleeve over the end of the pipe with connecting piece inserted therein in the case of a sliding sleeve connection, or radial pressing of a crimp sleeve over an end of the pipe with connecting piece guided therein), so the installer can no longer determine with a tightness test/pressure test whether all of the connections of a building installation system (water installation, pipe system of a floor heating system, or the like) have indeed been crimped.

Measures for resolving this problem known from the prior art involve the introduction of a predetermined leakage point in the non-crimped state, with the connection being sealed in a gas-tight or liquid-tight manner after crimping. For example, DE 298 13 935 U1 proposes the use of a gasket in such a pressed connection, with the gasket having recesses or thickened places that provide for the desired leakage point in the non-crimped state of the connection. However, this solution has the drawback that the sealing element can rotate during the assembly process, in which case there is a risk of the desired effect of a predetermined leakage point no longer being ensured.

Another possibility for establishing a connection with a predetermined leakage point follows from EP 1 278 001 B1. There, a method for establishing a pressed connection between a fitting and an end of a pipe with a sealing element inserted into a groove of the fitting is described, with the end of the pipe first being provided with a bead on the inside using a suitable tool that forms a leakage point before crimping with the fitting, upon which the end of the pipe can be calibrated and chamfered using the tool, followed by crimping. Moreover, EP 1 278 001 B1 describes a tool for use in this method that possesses separate expansion bodies for forming the bead on the inside of the pipe. However, the solution described in EP 1 278 001 B1 requires another tool that must be suited both to forming the bead and calibrating and chamfering the end of the pipe and therefore involves a complicated construction.

It is therefore the object of the invention to develop the possibilities for forming a predetermined leakage point in the non-crimped state in a pipe connection with expanded pipe ends to the effect that a tool without a complicated construction can be used. Furthermore, as few components as possible are to be used for establishing the corresponding pipe connection, and the predetermined leakage point is to no longer susceptible to adverse effects as a result of the assembly process.

This and other objects are achieved by an expansion head for expansion tools for hollow workpieces, particularly for the ends of plastic pipes and metal-plastic composite pipes, through the features of claim 1 and by an expansion tool for hollow workpieces with the features of claim 10 and the use according to claim 11. The basic manner in which the expansion tool according to the invention functions corresponds to the manner of functioning as described in connection with the expansion heads described in EP 0 044 795 A2 and DE 42 02 348 C1.

Preferred embodiments of the expansion head according to the invention are described in the dependent claims.

According to the present invention, it was recognized that, by providing a recess or raised area extending in the direction of the longitudinal axis of the expandable jaws on the otherwise approximately cylindrical outer wall of the expandable jaws, a commensurate deformation of the end of the pipe is brought about, thus ensuring a corresponding predetermined leakage point in the non-crimped state of the pipe connection. The corresponding expansion head has a simple construction and can be used with common expansion tools found on the market. Since the deformation occurs in the pipe, there is no danger of the predetermined leakage point becoming ineffective during crimping as a result of rotations within the connection.

Accordingly, the present invention lies in the provision of an expansion head for expansion tools for hollow workpieces, particularly for the ends of plastic pipes and metal-plastic composite pipes, which comprises a union cap with a radially inwardly oriented guide flange and a set of sector-shaped expandable jaws, each of which is received individually by an inner flange sector, particularly guided radially on the guide flange by the inner flange sector in a radial groove of the union cap, the set of sector-shaped expandable jaws being movable between a closed state and an expanded state, an approximately cylindrical lateral surface being formed in the closed state by the outer wall of the expandable jaws and the outer wall of at least one of the expandable jaws having at least one recess and/or raised area extending in the direction of the longitudinal axis of the expandable jaws. Moreover, the present invention lies in the provision of an expansion tool for hollow workpieces, particularly for the ends of pipes made of plastic and of plastic-coated metals, which comprises such an expansion head, as well as in the use of such an expansion head or of such an expansion tool.

It can prove expedient in this context if the recess and/or raised area is arranged approximately in the middle of the outer wall of the expandable jaw. Such an arrangement of the recess/raised area contributes to the stability of the expandable jaw and ensures sufficient deformation of the expanded pipe end, thus producing a sufficient predetermined leakage point during the expansion process.

Likewise, it can prove expedient if at least one of the expandable jaws has two recesses and/or raised areas. In this way, several predetermined leakage points can be produced in an expansion procedure. In this context, it can be especially advantageous if the two recesses and/or raised areas are each arranged on the lateral edge of the outer wall. In this way, the recesses/raised areas of two adjacent expandable jaws complement each other to form a corresponding recess/raised area with a larger width, thus producing a more pronounced deformation of the expanded pipe end.

It can also prove expedient if the recess(es) and/or raised area(s) extends or extend over 2% to 50% of the surface of the outer wall. A portion of raised areas and/or recesses in this region guarantees sufficient deformation of the expanded pipe end on the one hand and sufficient stability of the outer wall of the expandable jaws on the other hand. A surface ratio of 10% to 35% has proven expedient in this context, with a surface ratio of 15 to 30% being especially preferred.

It can also be advantageous if the recess(es) and/or raised area(s) have a maximum depth/height that corresponds to 3% to 35% of the diameter of the cylinder formed by the expandable jaws. Selecting the maximum depth of the recess(es) and of the maximum height of the raised area(s), in turn, ensures practically sufficient deformation of the expanded pipe end and, on the other hand, sufficient mechanical stability of the expandable jaws. In this regard, a maximum depth/height of 5 to 25% and, particularly, of 10 to 20% of the diameter of the cylinder formed by the expandable jaws has proven especially advantageous.

It can also be advantageous if the recess and/or raised area extends over the entire outer surface of at least one expandable jaw. A high level of mechanical strength of the individual expandable jaws is ensured in this way.

Likewise, at can prove advantageous if each of the expandable jaws has at least one recess and/or raised area. As a result, a high number of predetermined leakage points is produced that are indicative of faulty crimping in a tightness test.

It can also be helpful if the expandable jaws have a tapering or chamfer on their side facing away from the union cap. A uniform transition can be achieved in this way between the expanded and non-expanded portion of the hollow workpiece.

Likewise, it can prove expedient if the edges of the expandable jaws are rounded, broken or chamfered. As a result, the expandable jaws imprint less strongly into the material of the piper inner wall during the expanding process, so that a more stable pipe connection can be formed.

The present invention will be explained in detail in the following with reference to the exemplary embodiment depicted in the figures.

The present invention will be explained in detail in the following with reference to the exemplary embodiment depicted in the figures. As will readily be understood, the present invention is not intended to be limited to the exemplary embodiments shown.

DETAILED DESCRIPTION OF PREFERRED EMBODIMENTS

Figure 1A:
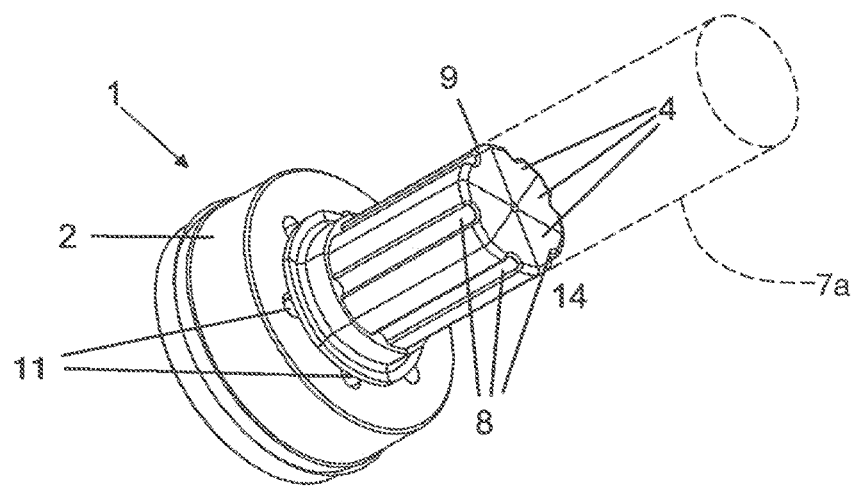
FIG. 1a shows a perspective view of an expansion head according to one embodiment of the present invention in the closed state.
Figure 1B:
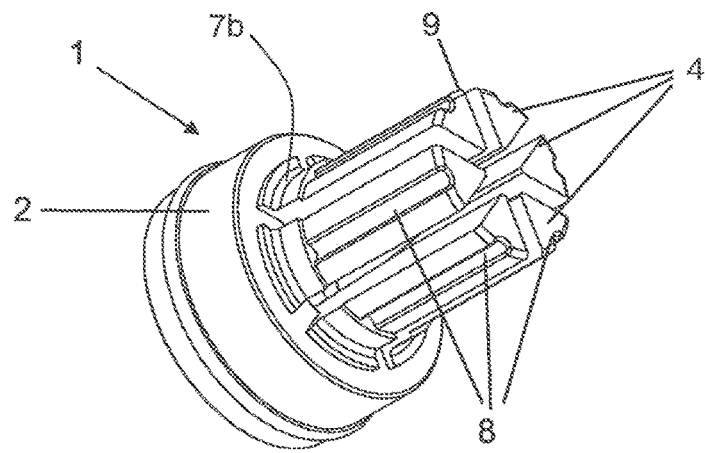
FIG. 1b shows a perspective view of the shown in FIG. 1a in the opened state.
Figure 1C:
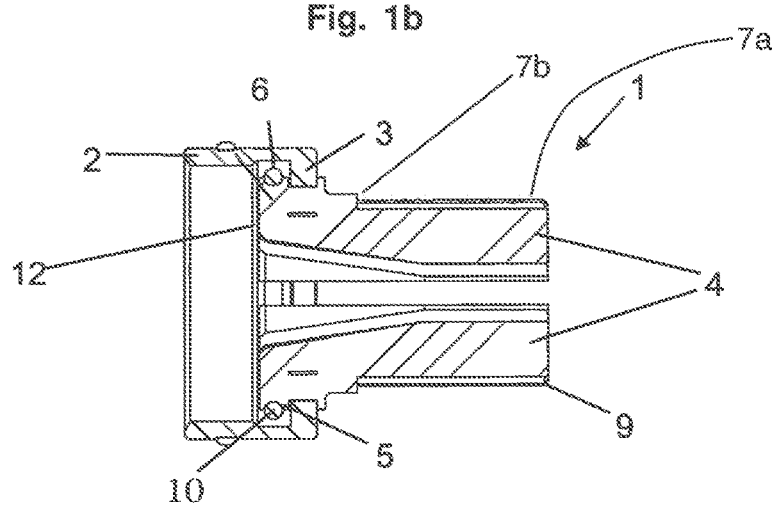
FIG. 1c shows a cross-sectional view of the expansion head shown in FIG. 1b in the opened state.
Figure 1D:
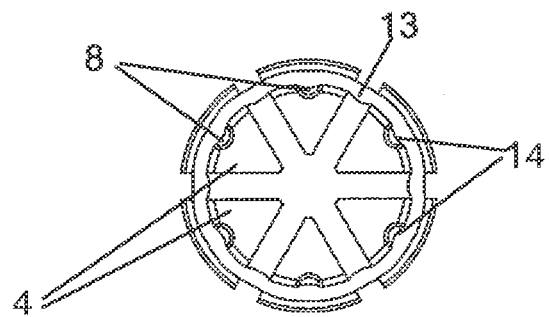
FIG. 1d shows a top view of the expandable jaws of the expansion head shown in FIG. 1b with pipe end placed on after the first expansion procedure.

FIG. 1 shows an expansion head according to one embodiment of the present invention in the closed state (FIG. 1a) and in the opened state or expanded state (FIG. 1b to FIG. 1d). The expansion head 1 according to the invention comprises a set of six expandable jaws 4 as well as a union cap 2, the expandable jaws 4 being guided through the opening of the union cap 2. In the closed state, the parts of the expandable jaws 4 protruding out of the union cap 2 form an approximately cylindrical expansion area. In the closed state, the outer wall 7 of the expandable jaws 4 approximately corresponds to a cylindrical lateral surface 7a (i.e., a cylindrical envelope). "Expansion area" refers herein to the area of the expansion head 1 on which the hollow workpiece to be expanded is located during the expansion procedure. The hollow workpiece rests against the outside of the expandable jaws 4. Together, the set of sector-shaped expandable jaws 4 take on a closed shape in the closed state of the expansion head 1 with a substantially cylindrical shape in the expansion area of the expansion head 1. On their side facing away from the union cap 2, the expandable jaws 4 have a respective taper 9 that is preferably embodied as a rounded-off edge area. By means of such a taper 9, a uniform transition can be achieved between the expanded and the non-expanded part of the hollow workpiece after the expanding procedure.

Each of the expandable jaws 4 is sector-shaped and has on a portion of the outer wall 7 a recess 8 extending in the direction of the longitudinal axis of the expandable jaws 4. The portion of the outer wall 7 is at least in part recessed and/or raised so as to define at least one recess and/or raised area relative to the cylindrical lateral surface 7a, from a proximal shoulder 7b adapted to butt up against an end of a hollow workpiece in the direction of the longitudinal axis of the expandable jaws to a distal end 7c thereof. The recess 8 is embodied in the middle of the outer surface 7 of the expandable jaw 4 and has a semicircular cross section. Alternatively, in other embodiments of the present invention, other cross sections, such as oval, triangular, rectangular, square cross sections and combinations of these cross-sectional shapes are also possible. The recess 8 extends over about 30% of the area of the outer surface 7 of the expandable jaw 4 and has at its deepest point a depth that corresponds to about 15% of the diameter of the cylinder formed by the expandable jaws 4.

The expansion head 1 shown in FIG. 1a is shown in FIG. 1b in the opened state. The expandable jaws are each arranged so as to be offset radially outward, so that they are now spaced apart from each other.

As the cross-sectional view of the expansion head 1 according to the invention shown in FIG. 1c illustrates, the union cap 2 has a radially inwardly oriented guide flange 3 and a set of sector-shaped expandable jaws 4. Each of the sector-shaped expandable jaws 4 is guided in a radially movable manner by an inner flange sector 5, which overlaps with the guide flange 3, in a radial groove 6 in the union cap 2. The inner flange sectors 5 have groove sectors on their outer sides that complement each other over the entire periphery of the expansion head 1 to form a circumferential groove on the outside of the inner flange sectors 5 into which an annular return means 10 for the returning of the expandable jaws 4 from the opened to the closed state of the expansion head 1 is received. The return means 10 is preferably selected such that its return force is sufficient for returning the expandable jaws 4 from the open to the closed state. In the depicted exemplary embodiment, the return means 10 is an elastic O-ring. Alternatively, an annular pull-spring can also be advantageously used. Each of the inner flange sectors 5 has a hole in which an end of the guide pin is respectively received.

Radial guide grooves 11 (FIG. 1a) are arranged in the guide flange 3 for receiving and moving guide pins. The number of guide grooves 11 corresponds to the number of guide pins and hence to the number of expandable jaws 4 of the expansion head 1. The guide pins can each be firmly connected with the inner flange sectors 10 by means of an interference fit in the associated hole in the inner flange sectors. In alternative embodiments of the expansion head 1 according to the invention, one end of the guide pins can be respectively screwed into a thread or pinned to the inner flange sector 5. Moreover, the guide pins 8 can also be molded in a single piece on the respective inner flange sector.

A fastening means serves to axially fix the expandable jaws 4 in the union cap 2. In the embodiment of the expansion head according to the invention shown in FIG. 1c, a fastening screw 12 pressed into the union cap 2 is used as a fastening means for the expandable jaws 4. In alternative embodiments, a retaining ring, a disc with a retaining ring or a threaded disc that is positioned in a thread on the inside of the union cap 2 can be used as a fastening means. The expandable jaws 4 are bounded on their inner side by tapered segment surfaces that complement each other to form a tapered surface in the closed state of the expansion head 1. The opening angle of the tapered segment surfaces corresponds here to the tapered angle of the expansion arbor of the expansion tool. As a result, the tapered surface of the expansion arbor works together with the tapered segment surfaces of the expandable jaws 4 during the expansion procedure. By driving the expansion arbor into the expansion head, the tapered surface of the expansion arbor pushes the tapered segment surfaces of the expandable jaws radially outward. If a hollow workpiece, such as a plastic pipe, guided over the outer surfaces of the expansion head 1, the outer surfaces of the expansion head 1 first rest against the inside of the pipe. As the penetration depth of the expansion arbor increases, the outer surfaces of the expandable jaws 4 are moved radially outward, as a result of which the pipe end that is guided over the expandable jaws 4 is expanded. To reduce the risk of the formation of longitudinal scoring in the expanded workpiece, the outer edges in the longitudinal direction of the expandable jaws 4 can be rounded off, broken or chamfered.

FIG. 1d shows a top view of the set of expandable jaws of the expansion head according to the invention with pipe end 13 placed on it after such an expansion procedure. In the area of the recesses 8 of each expandable jaw 4, the expanded pipe end has a significant deformation 14. A repetition of the expanding procedure after the rotation of the expansion tool by about 30° relative to the pipe end 13 does not lead to the complete removal of the deformations 14, so that the deformations 14 remain intact as predetermined leakage points in the non-crimped state of a pipe connection.

The present invention is explained below in relation to other embodiments. The differences are discussed in order to avoid repetitions, and additional explanations to the embodiment shown in FIG. 1a to FIG. 1d also apply accordingly to the other embodiments. Same reference symbols refer to the same objects.

Figure 2:
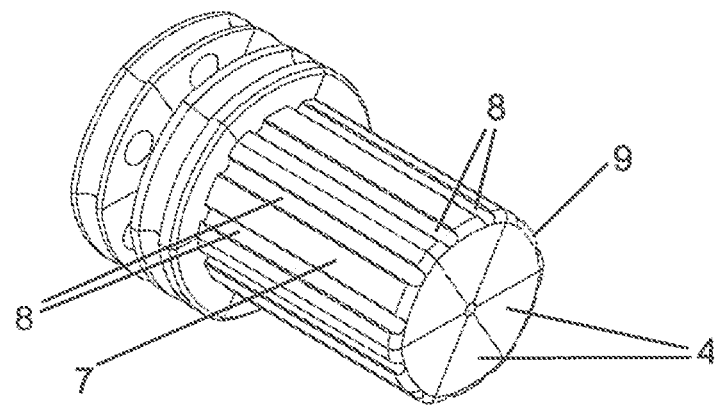
FIG. 2 shows a perspective view of a set of expandable jaws of an expansion head according to another embodiment of the present invention.

FIG. 2 shows the set of six expandable jaws 4 of an expansion head 1 according to another embodiment of the present invention in a perspective view, each of which, in turn, has a taper 9. Two recesses 8 extending in the direction of the longitudinal axis of the expandable jaws 4 are respectively arranged on the outer wall 7 of each of the sector-shaped expandable jaws 4. The recesses 8 are approximately symmetrical to the middle of the outer surface 7 and have a semicircular cross section, although other cross-sectional shapes can also be used alternatively. The recesses 8 take up about 50% of the surface of the outer wall 7 of each expandable jaw 4. At the deepest point, the depth of the recess corresponds to about 20% of the diameter of the cylinder formed by the expandable jaws 4.

When carrying out an expansion procedure on a pipe end 13, deformations 14 are formed at each of the recesses 8—two deformations 14 per expandable jaw 4 in this case. A repetition of the expansion procedure after rotation of the expansion tool by about 30° relative to the pipe end 13 does not lead to the complete removal of the deformations 14, so that the deformations 14 remain intact as predetermined leakage points in the non-crimped state of a pipe connection.

Figure 3A:
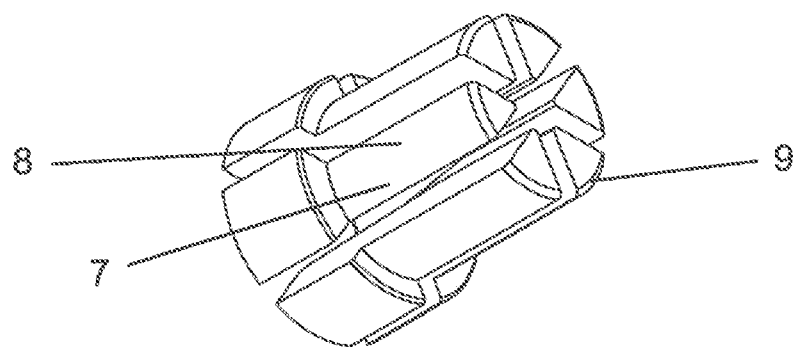
FIG. 3a shows a perspective view of a set of expandable jaws of an expansion head according to another embodiment of the present invention.

Another set of six expandable jaws 4 of an expansion head 1 according to another embodiment of the present invention is shown in FIG. 3a in a perspective view. In this embodiment, the outer wall 7 of one of the expandable jaws 4 is offset radially in the direction of the longitudinal axis of the expandable jaws 4. In this case, the recess 8 therefore extends over the entire outer wall 7 of this expandable jaw 4. The recess 8 takes up about 17% of the surface of the outer wall 7 of the expandable jaws 4; its depth corresponds to about 10% of the diameter of the cylinder formed by the expandable jaws 4.

Figure 3B:
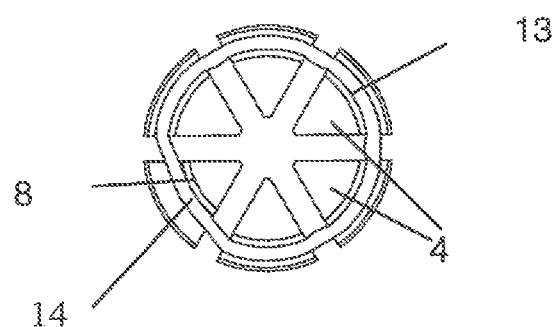
FIG. 3b shows a top view of the expandable jaws of the expansion head shown in FIG. 3a with pipe end placed on after the first expansion procedure.

FIG. 3b shows a top view of the set of expandable jaws of the expansion head according to the invention with pipe end 13 placed on top of it after a first expansion procedure. A large-area deformation 14 is embodied in the area of the expandable jaw 4 offset radially in the direction of the longitudinal axis. A repetition of the expansion procedure after rotation of the expansion tool by about 30° relative to the pipe end 13 results in the deformation 14 remaining at least partially intact. In the non-crimped state of a pipe connection, the remains of this deformation 14 thus constitute a predetermined leakage point.

Figure 4:
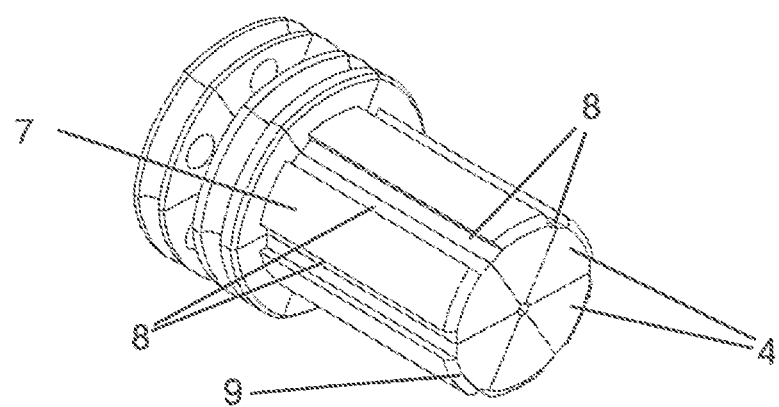
FIG. 4 shows a perspective view of a set of expandable jaws of an expansion head according to another embodiment of the present invention.

FIG. 4 shows a perspective view of the set of six expandable jaws 4 of an expansion head 1 according to another embodiment of the present invention. In this embodiment as well, recesses 8 extending in the direction of the longitudinal axis of the expandable jaws 4 are arranged on the lateral edge of the sector-shaped expandable jaws 4. However, they have a rectangular cross section, so that the recesses 8 of adjacent expandable jaws complement each other to form a likewise rectangular recess. Alternatively, other cross-sectional shapes can be used here as well. The recesses 8 take up about 25% of the surface of the outer wall 7 of each expandable jaw 4. The depth of the recess corresponds to about 10% of the diameter of the cylinder formed by the expandable jaws 4.

Upon execution of an expansion procedure on a pipe end 13, deformations of the pipe end 13 are respectively formed at the depressions formed by the recesses 8. A repetition of the expansion procedure after rotation of the expansion tool by about 30° relative to the pipe end 13 does not lead to the complete removal of the deformations 14, so that the deformations 14 remain intact as predetermined leakage points in the non-crimped state of a pipe connection.

Figure 5A:
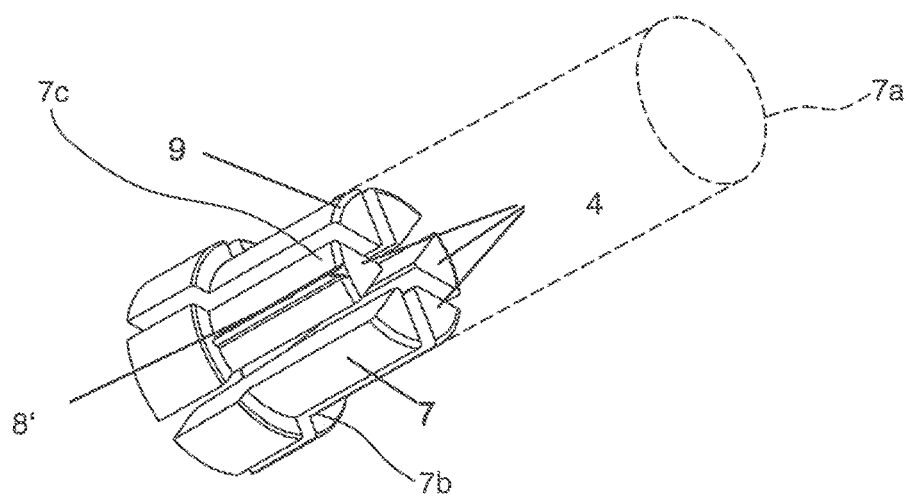
FIG. 5a shows a perspective view of a set of expandable jaws of an expansion head according to another embodiment of the present invention.

FIG. 5a shows a perspective view of another set of six sector-shaped expandable jaws 4 of an expansion head 1 according to another embodiment of the present invention. Here, one of the expandable jaws 4 has a raised area 8 extending in the direction of the longitudinal axis of the expandable jaws 4. The raised area 8 is embodied in the middle of the outer surface 7 of the expandable jaw 7 and has a triangular cross section. In other embodiments of the present invention, other cross sections, such as round, oval, rectangular and square cross sections as well as combinations of these cross-sectional shapes, are also possible as alternatives. The raised area 8 extends over about 3% of the surface of the outer surface 7 of the expandable jaw 7 and has a height at its highest point that corresponds to about 5% of the diameter of the cylinder formed by the expandable jaws 4.

Figure 5B:
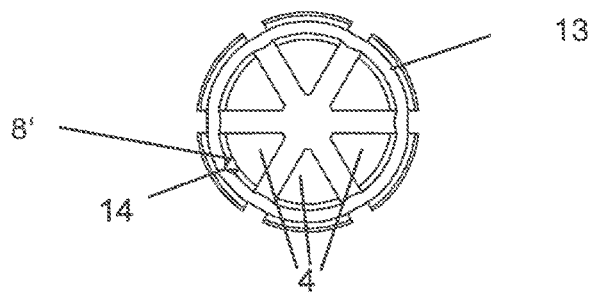
FIG. 5b shows a top view of the expandable jaws of the expansion head shown in FIG. 5a with pipe end placed on after the first expansion procedure.

FIG. 5b shows a top view of the set of expandable jaws of the expansion head according to the invention after such an expansion procedure. The expanded pipe end has a substantial deformation 14 in the area of the raised area 8. A repetition of the expansion procedure after rotation of the expansion tool by about 300 relative to the pipe end 13 results in the deformations 14 remaining approximately unchanged. In the non-crimped state of a pipe connection, the deformation 14 thus brings about a predetermined leakage point.

In the foregoing, the invention was explained in detail with reference to preferred embodiments, but these examples must not be interpreted as limiting its scope.

The invention claimed is:

1. Expansion head for expansion tools for hollow workpieces comprising:
    a union cap with a radially inwardly oriented guide flange, and
    a set of sector-shaped expandable jaws, each of which is individually received in the union cap in a radially movable manner by an inner flange sector that overlaps with the guide flange, the set of sector-shaped expandable jaws being movable between a closed state and an expansion state, and an approximately cylindrical lateral surface being embodied in the closed state by the outer wall of the expandable jaws,
    wherein the outer wall is at least in part recessed and/or raised so as to define at least one recess and/or raised area relative to the cylindrical lateral surface, from a proximal shoulder adapted to butt up against an end of a hollow workpiece in the direction of the longitudinal axis of the expandable jaws to a distal end thereof.

2. Expansion head according to claim 1, wherein the recess and/or raised area is arranged approximately in the middle of the outer wall of the expandable jaw.

3. Expansion head according to claim 2, wherein the at least one recess(es) and/or raised area(s) extends or extend over 2% to 50% of the surface of the outer wall.

4. Expansion head according to claim 2, wherein the at least one recess(es) and/or raised area(s) has or have a maximum depth/height that corresponds to 3% to 35% of the diameter of the cylindrical lateral surface.

5. Expansion head according to claim 2, wherein the recess and/or raised area extends along an entire longitudinal length of the outer surface of at least one expandable jaw.

6. Expansion head according to claim 1, wherein at least one of the expandable jaws has two recesses and/or raised areas.

7. Expansion head according to claim 6, wherein each of the two recesses and/or raised areas is arranged on the lateral edge of the outer wall.

8. Expansion head according to claim 7, wherein the recess(es) and/or raised area(s) extends or extend over 2% to 50% of the surface of the outer wall.

9. Expansion head according to claim 7, wherein the recess(es) and/or raised area(s) has or have a maximum depth/height that corresponds to 3% to 35% of the diameter of the cylindrical lateral surface.

10. Expansion head according to claim 6, wherein the recess(es) and/or raised area(s) extends or extend over 2% to 50% of the surface of the outer wall.

11. Expansion head according to claim 6, wherein the recess(es) and/or raised area(s) has or have a maximum depth/height that corresponds to 3% to 35% of the diameter of the cylindrical lateral surface.

12. Expansion head according to claim 1, wherein the at least one recess(es) and/or raised area(s) extends or extend over 2% to 50% of the surface of the outer wall.

13. Expansion head according to claim 12, wherein the at least one recess(es) and/or raised area(s) has or have a maximum depth/height that corresponds to 3% to 35% of the diameter of the cylindrical lateral surface.

14. Expansion head according to claim 1, wherein the at least one recess(es) and/or raised area(s) has or have a maximum depth/height that corresponds to 3% to 35% of the diameter of the cylindrical lateral surface.

15. Expansion head according to claim 1, wherein the recess and/or raised area extends along an entire longitudinal length of the outer surface of at least one expandable jaw.

16. Expansion head according to claim 1, wherein each of the expandable jaws has at least one recess and/or raised area.

17. Expansion head according to claim 1, wherein the expandable jaws have a taper or chamfer on their side facing away from the union cap.

18. Expansion tool for hollow workpieces, comprising an expansion head according to claim 1.

* * * * *